(12) United States Patent
Putz et al.

(10) Patent No.: US 12,494,069 B2
(45) Date of Patent: Dec. 9, 2025

(54) METHOD FOR DETERMINING A STATE OF A DRIVER MONITORING DEVICE AND DRIVER MONITORING DEVICE

(71) Applicant: VALEO SCHALTER UND SENSOREN GMBH, Bietigheim-Bissingen (DE)

(72) Inventors: Thomas Putz, Bad Rodach (DE); Mahmoud Tamam, Cairo (EG); Thomas Haebig, Bad Rodach (DE)

(73) Assignee: VALEO SCHALTER UND SENSOREN GMBH, Bietigheim-Bissingen (DE)

( * ) Notice: Subject to any disclaimer, the term of this patent is extended or adjusted under 35 U.S.C. 154(b) by 0 days.

(21) Appl. No.: 18/859,081

(22) PCT Filed: Apr. 19, 2023

(86) PCT No.: PCT/EP2023/060061
§ 371 (c)(1),
(2) Date: Oct. 22, 2024

(87) PCT Pub. No.: WO2023/203047
PCT Pub. Date: Oct. 26, 2023

(65) Prior Publication Data
US 2025/0278949 A1    Sep. 4, 2025

(30) Foreign Application Priority Data

Apr. 22, 2022 (DE) ............ 10 2022 109 756.0

(51) Int. Cl.
*G06V 20/59* (2022.01)
*H04N 23/56* (2023.01)

(52) U.S. Cl.
CPC ........... *G06V 20/597* (2022.01); *H04N 23/56* (2023.01)

(58) Field of Classification Search
CPC .... G06V 20/597; G06V 10/14; G06V 10/141; G06V 30/1431; H04N 23/56
See application file for complete search history.

(56) References Cited

U.S. PATENT DOCUMENTS

| | | | |
|---|---|---|---|
| 2015/0186737 A1* | 7/2015 | Omi | G01B 11/14 348/77 |
| 2021/0197747 A1* | 7/2021 | Yoshizawa | B60Q 3/80 |
| 2024/0326825 A1* | 10/2024 | Quintao Severgnini | B60W 60/00 |

FOREIGN PATENT DOCUMENTS

| | | |
|---|---|---|
| DE | 11 2018 005 748 T5 | 7/2020 |
| JP | 6278106 B2 | 2/2018 |

OTHER PUBLICATIONS

German Search Report Issued in Corresponding German Application No. 10 2022 109 756.0, dated Nov. 23, 2022.

(Continued)

*Primary Examiner* — James M Pontius
(74) *Attorney, Agent, or Firm* — Osha Bergman Watanabe & Burton LLP

(57) ABSTRACT

A method for determining a state of a driver monitoring device includes generating a first image. The first image is based on an image of an interior illuminated by means of an illumination device. The method includes dividing the first image into multiple image sections. The method includes determining a maximum intensity of pixels of a first group of image sections of the first image and an average intensity of a second group of image sections of the first image and determining a difference in illumination of the first image by dividing the maximum intensity of the first group by the mean intensity of the second group. The method includes determining whether or not a diffuser is functional and properly arranged and activating or deactivating the illumination device for driver monitoring if the difference in (Continued)

illumination of the first image is smaller or greater than a lower threshold value.

16 Claims, 6 Drawing Sheets

(56) References Cited

OTHER PUBLICATIONS

International Search Report Issued in Corresponding PCT Application No. PCT/EP2023/060061, dated Aug. 1, 2023 (5 Pages with English Translation).
Written Opinion of the International Searching Authority issued in Corresponding PCT Application No. PCT/ EP2023/060061, dated Aug. 1, 2023 (13 Pages with English Translation).

* cited by examiner

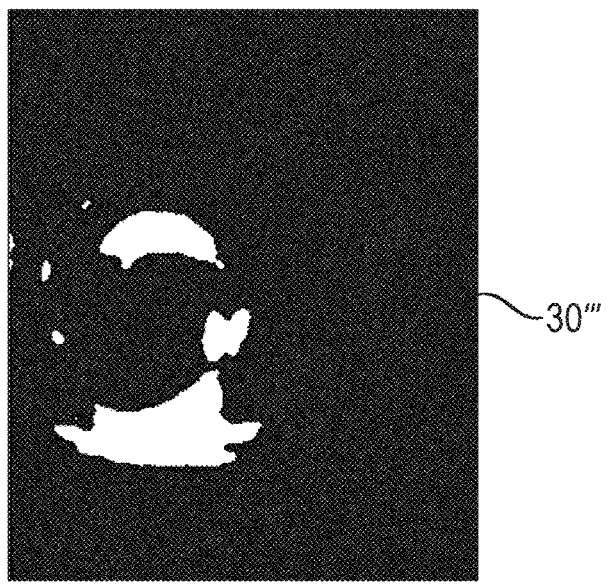
Fig. 9
 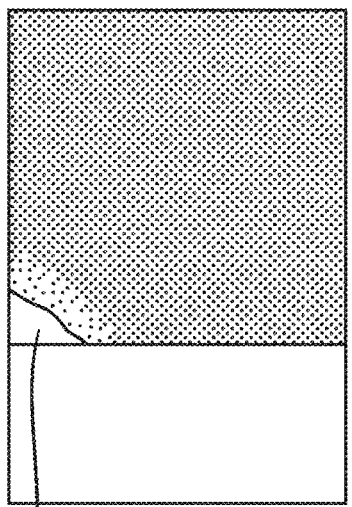 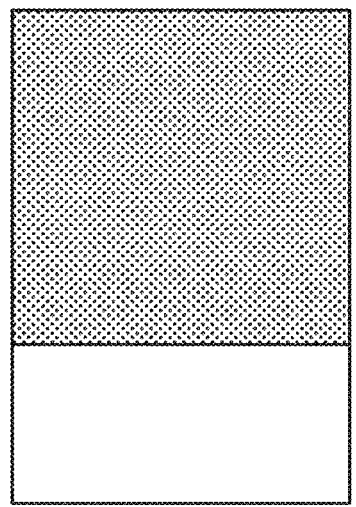
Fig. 10　　Fig. 11　　Fig. 12

METHOD FOR DETERMINING A STATE OF A DRIVER MONITORING DEVICE AND DRIVER MONITORING DEVICE

The present invention relates to a method for determining a state of a driver monitoring device and to a driver monitoring device.

Driver monitoring devices, which comprise an illumination device, for example in the form of a laser, in particular in the form of a VCSEL (Vertical Cavity Surface Emitting Laser), for illuminating an area of an interior of a vehicle in which the driver's head is located, and an image capturing device for capturing an image of the driver's head illuminated using the illumination device, are used to take the image of the head, in particular of the eyes, of the driver as a basis for determining whether the driver is distracted or tired, and, if necessary, to output a warning signal to warn the driver or to prompt them to take a break. Since direct irradiation of the light of the illumination device onto the driver's head would damage their eyes, provided in the beam path of the light is a diffuser which scatters the light in such a way that the intensity of the light hitting the eyes is too low to damage the eyes. However, if the diffuser becomes loose and falls or is otherwise restricted in terms of its operation, there is a risk of damage to the driver's eyes.

It is an object of the present invention to provide a method for determining a state of a driver monitoring device and a corresponding driver monitoring device which can be used to increase the safety of the driver.

This object is achieved by the features of the independent claims. Advantageous developments of the invention are the subject matter of the dependent claims.

A method for determining a state of a driver monitoring device which comprises an illumination device for illuminating an interior of a vehicle, a diffuser arranged in a beam path of the illumination device in the correct state of the driver monitoring device for scattering a light emitted by the illumination device, and an image capturing device for capturing an image of the interior, comprises the following steps according to one embodiment:

b) illuminating, by means of the illumination device, the interior, and generating at least one first image of at least one section of the interior, which first image is based on an image of the interior which is illuminated by means of the illumination device, said image being captured by the image capturing device, c) dividing the at least one first image into a left upper image section, a right upper image section, a left middle image section, a right middle image section, a left lower image section and a right lower image section, d) determining a maximum intensity of pixels of a first group of image sections of the at least one first image, said group comprising the left middle image section and the right middle image section, and determining an average intensity of a second group of image sections of the at least one first image, said group comprising the left upper image section, the right upper image section and the right lower image section or the left upper image section, the right upper image section and the left lower image section, e) determining a difference in illumination of the at least one first image by dividing the maximum intensity of the first group of image sections of the at least one first image by the mean intensity of the second group of image sections of the at least one first image, and f) determining that the diffuser is functional and properly arranged in the beam path of the illumination device and activating the illumination device for driver monitoring if the difference in illumination of the at least one first image is lower than a lower threshold value, or determining that the diffuser is not functional and properly arranged in the beam path of the illumination device and deactivating the illumination device if the difference in illumination is greater than an upper threshold value.

The illumination device may comprise in particular a laser, preferably a VCSEL. In this case, the image capturing device is configured in particular such that the driver's head is located substantially in the middle of the field of vision of the image capturing device, while the illumination device is configured such that, without an upstream diffuser, the main portion of the light falls on the driver's head.

Furthermore, in step c), the at least one image is preferably divided into six image sections of the same size, wherein, in step d), the second group is selected in particular in such a way that only a small section of an image of a side window of the vehicle is contained in the image sections of the group in order to minimize the influence of extraneous light.

The upper threshold value and the lower threshold value, with which the illumination difference is compared in step f) to determine whether the diffuser is functional and properly arranged in the beam path of the illumination device, are preferably determined or set based on an empirical method in which images of a driver's head located in the interior of the vehicle are captured using the image capturing device in states in which the interior is illuminated using the illumination device under different (extraneous) lighting conditions and the diffuser is either functional and properly arranged in the beam path of the illumination device or it is not.

Due to this configuration of the driver monitoring device, in many cases it can already be determined by comparison of the illumination difference with the upper or lower threshold value whether or not the diffuser is functional and properly arranged in the beam path of the illumination device, and thus whether or not there is a risk of damage to the driver's eyes, where, in the event of a potential risk to the eyes, the illumination device is deactivated in order to prevent (further) damage.

According to one embodiment, the method furthermore comprises the steps of:

g) applying a Laplace filter to the at least one first image if the difference in illumination is greater than the lower threshold value and smaller than the upper threshold value so as to obtain a modified at least one first image, and capturing at least one edge in the modified at least one first image, h) setting an intensity value of pixels of the modified at least one first image which have no section of the at least one edge to a maximum intensity value, and setting the intensity value of pixels of the modified at least one first image which do have a section of the at least one edge to a minimum intensity value so as to obtain a modified at least one first image, i) applying a median filter to the modified at least one first image so as to obtain a filtered at least one first image, j) removing one or more sections of the filtered at least one first image, wherein at least one section contains an image of at least one section of a steering wheel area of the vehicle so as to obtain a test image section of the filtered at least one first image, and k) determining a number of pixels with maximum intensity in the test image section of the filtered at least one first image and, based on the number of pixels with maximum intensity in the test image section of the filtered at least one first image, in particular based on a number of pixels with maximum intensity scaled to a predetermined image size and a comparison of the number of pixels scaled to the predetermined image size with a threshold value, determining whether or not the diffuser is functional and properly arranged in the beam path of the illumination device, and storing a piece of corresponding information in a storage unit of a control unit of the vehicle.

As a result, in one embodiment, even in unfavorable (extraneous) light conditions, it can be correctly determined with a high degree of certainty whether or not the diffuser is functional and properly arranged in the beam path of the illumination device.

In this case, the threshold value can be determined or set in an analogous manner as described above using an empirical method, preferably using a confusion matrix.

According to one embodiment, the method furthermore comprises the following steps:
  b1) generating at least one second image of the at least one section of the interior, said second image being based on an image captured by the image capturing device while the interior is not illuminated by means of the illumination device,
  c1) dividing the at least one second image into a left upper image section, a right upper image section, a left middle image section, a right middle image section, a left lower image section and a right lower image section,
  d1) determining a maximum intensity of pixels of a first group of image sections of the at least one second image, said group comprising the left lower image section and the right lower image section, and determining an average intensity of a second group of image sections of the at least one second image, said group comprising the left upper image section, the right upper image section and the right lower image section or the left upper image section, the right upper image section and the left lower image section,
  e1) determining a difference in illumination of the at least one second image by dividing the maximum intensity of the first group of image sections of the at least one second image by the mean intensity of the second group of image sections of the at least one second image,
  g1) applying a Laplace filter to the at least one second image if the difference in illumination is greater than the lower threshold value and smaller than the upper threshold value so as to obtain a modified at least one second image, and capturing at least one edge in the modified at least one second image,
  h1) setting an intensity value of pixels of the modified at least one second image which have no section of the at least one edge to a maximum intensity value, and setting the intensity value of pixels of the modified at least one second image which do have a section of the at least one edge to a minimum intensity value so as to obtain a modified at least one second image,
  i1) applying a median filter to the modified at least one second image so as to obtain a filtered at least one second image,
  j1) removing one or more sections of the filtered at least one second image, wherein at least one section contains an image of at least one section of a steering wheel area of the vehicle so as to obtain a test image section of the filtered at least one second image, and
  k1) determining a number of pixels with maximum intensity in the test image section of the filtered at least one second image, wherein, in step k), based on the number of pixels with maximum intensity in the test image section of the filtered at least one first image and the number of pixels with maximum intensity in the test image section of the filtered at least one second image, in particular based on a number of pixels with maximum intensity scaled to a predetermined image size and a comparison of the number of pixels scaled to the predetermined image size with a threshold value, it is determined whether or not the diffuser is functional and properly arranged in the beam path of the illumination device.

According to one embodiment, in step b), a first image which is based on an image which is captured by the image capturing device with a first exposure time of preferably 36 µs is generated and another first image which is based on an image which is captured by the image capturing device with a second exposure time of preferably 640 µs is generated, in step b1), a second image which is based on an image which is captured by the image capturing device with the first exposure time is generated and another second image which is based on an image which is captured by the image capturing device with the second exposure time is generated, and, in step k), it is determined, based on the number of pixels with maximum intensity in the test image section of the filtered one first image, the number of pixels with maximum intensity in the test image section of the filtered other first image, the number of pixels with maximum intensity in the test image section of the one filtered second image and the number of pixels with maximum intensity in the test image section of the filtered other second image, whether or not the diffuser is functional and properly arranged in the beam path of the illumination device.

According to one embodiment, in step b), the interior is illuminated by means of the illumination device with light of an intensity lower than an intensity of a light with which the interior is illuminated during normal operation of the driver monitoring device. Here, in step b), the intensity of the light can advantageously be selected such that, even in the case of the light directly impinging on the driver's eyes, that is to say without it having been scattered by a diffuser beforehand, the eyes are not damaged.

According to one embodiment, the generation of the at least one first image and/or of the at least one second image comprises an extraction of an image section of an image based on the image of the interior captured by the image capturing device and/or a reduction of a file size of an image based on the image of the interior captured by the image capturing device.

According to one embodiment, in step b) and/or in step b1), a left-hand image section is extracted when the vehicle is configured as right-hand drive and a right-hand image section is extracted when the vehicle is configured as left-hand drive, wherein, in step d) and/or step d1), the second group comprises the left upper image section, the right upper image section and the right lower image section when the vehicle is configured as right-hand drive, and the second group comprises the left upper image section, the right upper image section and the left lower image section when the vehicle is configured as left-hand drive.

According to one embodiment, the method further comprises the following step, carried out before step b):

a) communicating with the control unit of the vehicle in order to determine, based on the information stored in the storage unit, whether or not the diffuser is functional and properly arranged in the beam path of the illumination device, and permanently deactivating the illumination device and terminating the method if the information stored in the storage unit is that the diffuser is not functional and properly arranged in the beam path of the illumination device, or continuing the method with step b) when the information stored in the storage unit is that the diffuser is functional and properly arranged in the beam path of the illumination device.

A driver monitoring device according to one embodiment comprises an illumination device for illuminating an interior of a vehicle, a diffuser arranged in a beam path of the illumination device in the correct state of the driver monitoring device for scattering a light emitted by the illumination device, and an image capturing device for capturing an image of the interior, wherein the driver monitoring device is configured b) to illuminate, by means of the illumination device, the interior, and to generate at least one first image of at least one section of the interior, which first image is based on an image of the interior which is illuminated by means of the illumination device, said image being captured by the image capturing device, c) to divide the at least one first image into a left upper image section, a right upper image section, a left middle image section, a right middle image section, a left lower image section and a right lower image section, d) to determine a maximum intensity of pixels of a first group of image sections of the at least one first image, said group comprising the left middle image section and the right middle image section, and to determine an average intensity of a second group of image sections of the at least one first image, said group comprising the left upper image section, the right upper image section and the right lower image section or the left upper image section, the right upper image section and the left lower image section, e) to determine a difference in illumination of the at least one first image by dividing the maximum intensity of the first group of image sections of the at least one first image by the mean intensity of the second group of image sections of the at least one first image, and f) to determine that the diffuser is functional and properly arranged in the beam path of the illumination device and to activate the illumination device for driver monitoring if the difference in illumination of the at least one first image is smaller than a lower threshold value, or to determine that the diffuser is not functional and properly arranged in the beam path of the illumination device and to deactivate the illumination device if the difference in illumination is greater than an upper threshold value.

According to one embodiment, the driver monitoring device is furthermore configured:

g) to apply a Laplace filter to the at least one first image if the difference in illumination is greater than the lower threshold value and smaller than the upper threshold value so as to obtain a modified at least one first image, and to capture at least one edge in the modified at least one first image, h) to set an intensity value of pixels of the modified at least one first image which have no section of the at least one edge to a maximum intensity value, and to set the intensity value of pixels of the modified at least one first image which do have a section of the at least one edge to a minimum intensity value so as to obtain a modified at least one first image, i) to apply a median filter to the modified at least one first image so as to obtain a filtered at least one first image, j) to remove one or more sections of the filtered at least one first image, wherein at least one section contains an image of at least one section of a steering wheel area of the vehicle so as to obtain a test image section of the filtered at least one first image, and k) to determine a number of pixels with maximum intensity in the test image section of the filtered at least one first image and, based on the number of pixels with maximum intensity in the test image section of the filtered at least one first image, in particular based on a number of pixels with maximum intensity scaled to a predetermined image size and a comparison of the number of pixels scaled to the predetermined image size with a threshold value, to determine whether or not the diffuser is functional and properly arranged in the beam path of the illumination device, and to store a piece of corresponding information in a storage unit of a control unit of the vehicle.

According to one embodiment, the driver monitoring device is furthermore configured:

b1) to generate at least one second image of the at least one section of the interior, said second image being based on an image captured by the image capturing device while the interior is not illuminated by means of the illumination device, c1) to divide the at least one second image into a left upper image section, a right upper image section, a left middle image section, a right middle image section, a left lower image section and a right lower image section, d1) to determine a maximum intensity of pixels of a first group of image sections of the at least one second image which comprises the left lower image section and the right lower image section, and to determine an average intensity of a second group of image sections of the at least one second image which comprises the left upper image section, the right upper image section and the right lower image section or the left upper image section, the right upper image section and the left lower image section, e1) to determine a difference in illumination of the at least one second image by dividing the maximum intensity of the first group of image sections of the at least one second image by the mean intensity of the second group of image sections of the at least one second image, g1) to apply a Laplace filter to the at least one second image if the difference in illumination is greater than the lower threshold value and smaller than the upper threshold value so as to obtain a modified at least one second image, and to capture at least one edge in the modified at least one second image, h1) to set an intensity value of pixels of the modified at least one second image which have no section of the at least one edge to a maximum intensity value, and to set the intensity value of pixels of the modified at least one second image which do have a section of the at least one edge to a minimum intensity value so as to obtain a modified at least one second image, i1) to apply a median filter to the modified at least one second image so as to obtain a filtered at least one second image, j1) to remove one or more sections of the filtered at least one second image, wherein at least one section contains an image of at least one section of a steering wheel area of the vehicle so as to obtain a test image section of the filtered at least one second image, and k1) to determine a number of pixels with maximum intensity in the test image section of the filtered at least one second image, wherein the driver monitoring device is configured, in step k), based on the number of pixels with maximum intensity in the test image section of the filtered at least one first image and the number of pixels with maximum intensity in the test image section of the filtered at least one second image, in particular based on a number of pixels with maximum intensity scaled to a predetermined image size and a comparison of the number of pixels scaled to the predetermined image size with a threshold value, to determine whether or not the diffuser is functional and properly arranged in the beam path of the illumination device.

According to one embodiment, the driver monitoring device is configured, in step b), to generate a first image which is based on an image which is captured by the image capturing device with a first exposure time of preferably 36 µs and to generate another first image which is based on an image which is captured by the image capturing device with a second exposure time of preferably 640 µs, in step b1), to generate a second image which is based on an image which is captured by the image capturing device with the first exposure time and to generate another second image which is based on an image which is captured by the image capturing device with the second exposure time, and, in k), to determine, based on the number of pixels with maximum intensity in the test image section of the filtered one first image, the number of pixels with maximum intensity in the test image section of the filtered other first image, the number of pixels with maximum intensity in the test image section of the one filtered second image and the number of pixels with maximum intensity in the test image section of the filtered other second image, whether or not the diffuser is functional and properly arranged in the beam path of the illumination device.

According to one embodiment, the driver monitoring device is configured, in b), to illuminate the interior by means of the illumination device with light of an intensity lower than an intensity of a light with which the interior is illuminated during normal operation of the driver monitoring device.

According to one embodiment, the driver monitoring device is configured to generate the at least one first image and/or the at least one second image by extracting an image section of an image based on the image of the interior captured by the image capturing device and/or by reducing a file size of an image based on the image of the interior captured by the image capturing device.

According to one embodiment, the driver monitoring device is configured, in b) and/or in b1), to extract a left-hand image section when the vehicle is configured as right-hand drive and to extract a right-hand image section when the vehicle is configured as left-hand drive, wherein, in d) and/or d1), the second group comprises the left upper image section, the right upper image section and the right lower image section when the vehicle is configured as right-hand drive, and the second group comprises the left upper image section, the right upper image section and the left lower image section when the vehicle is configured as left-hand drive.

According to one embodiment, the driver monitoring device is configured, before b):

a) to communicate with the control unit of the vehicle in order to determine, based on the information stored in the storage unit, whether or not the diffuser is functional and properly arranged in the beam path of the illumination device, and to permanently deactivate the illumination device and to terminate the driver monitoring operation if the information stored in the storage unit is that the diffuser is not functional and properly arranged in the beam path of the illumination device, or to continue the driver monitoring operation with b) when the information stored in the storage unit is that the diffuser is functional and properly arranged in the beam path of the illumination device.

Further advantages, features and application possibilities of the present invention can be found in the following detailed description in conjunction with the figures.

In the figures:

FIG. 1 schematically shows a vehicle having a driver monitoring device according to one embodiment of the invention;

FIG. 9 shows a filtered image which is based on the image shown in FIG. 8 and to which a median filter has been applied;

FIG. 10 shows an image of the interior which is generated based on an image captured by the image capturing device;

FIG. 11 shows an image section of an image which is based on the generated image shown in FIG. 10; and FIG. 12 shows the image shown in FIG. 11, from which an image of a steering wheel area has been removed.

Figure 1:
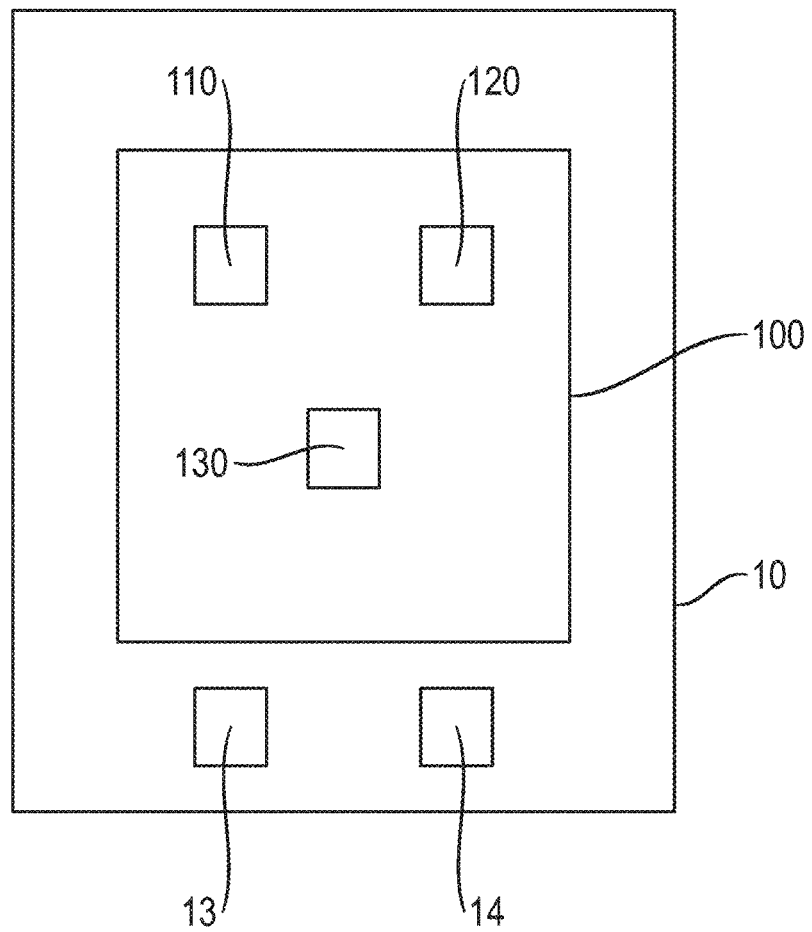

FIG. 1 schematically shows a vehicle having a driver monitoring device according to one embodiment of the invention.

The vehicle 10, for example a passenger car, comprises a control unit 13, which has a storage unit 14, and a driver monitoring device 100. The driver monitoring device 100 comprises an illumination device 110, for example a laser, in particular a VCSEL, for illuminating an interior 11 of the vehicle 10 illustrated in FIG. 2, an image capturing device 130, and a diffuser, which is arranged in a beam path of the illumination device 110 in a correct state of the driver monitoring device 100, for scattering the light emitted by the illumination device 110.

The image capturing device 130 is configured to capture an image of a head, in particular the eyes, of a driver of the vehicle 10 in order to be able to determine based on the image whether the driver is tired or distracted. In this case, the illumination device 110 is configured to illuminate, in particular, the driver's head.

The storage unit 14 is configured to store a piece of information about whether or not the diffuser 120 is functional and properly arranged in the beam path of the illumination device 130.

In the method according to the invention or by means of the driver monitoring device 100 according to the invention, communication with the control unit 13 of the vehicle 10 is first carried out to determine, based on the information stored in the storage unit 14, whether or not the diffuser 120 is functional and properly arranged in the beam path of the illumination device 130.

If it is determined here that the diffuser 120 is not functional and properly arranged in the beam path of the illumination device 130, the illumination device 110 is permanently deactivated and the method or the driver monitoring operation is terminated. On the other hand, if it is determined that the diffuser 120 is functional and properly arranged in the beam path of the illumination device 130, the method according to the invention continues with the steps described below.

Figure 2:
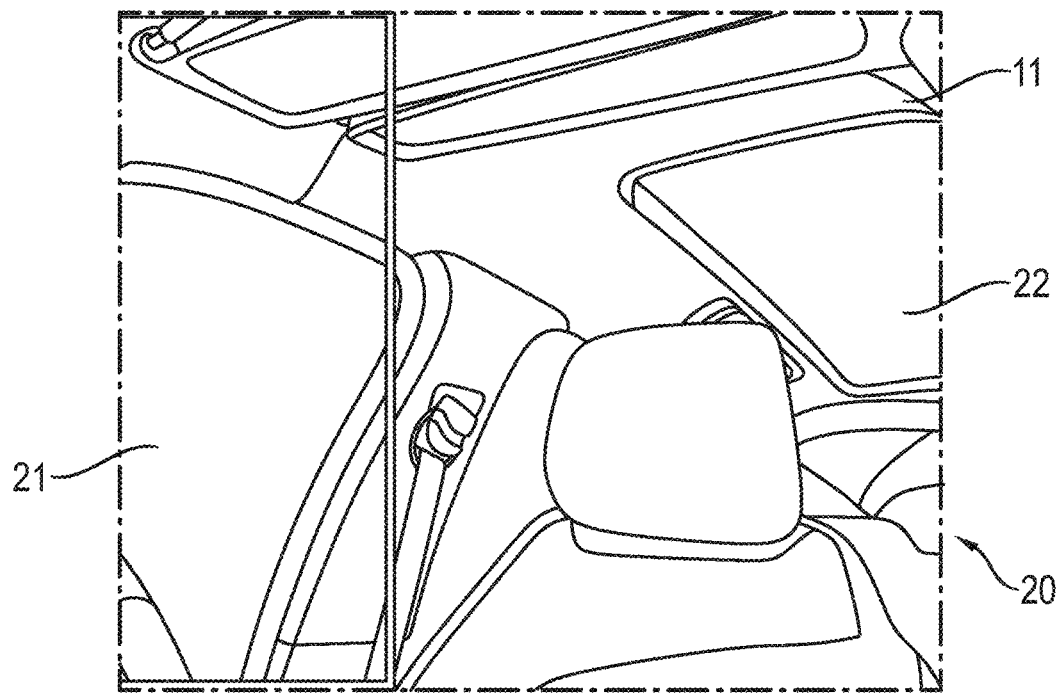
FIG. 2 shows an image of an interior of a vehicle captured by means of an image capturing device.

FIG. 2 shows an image 20 of the interior 11 of a vehicle 10, configured as right-hand drive, which is captured by means of the image capturing device 130, said image comprising a left-hand image section 21 and a right-hand image section 22, which is of interest in the present case since this contains an image of the driver's head in the event of the driver sitting in the vehicle 10.

Figure 3:
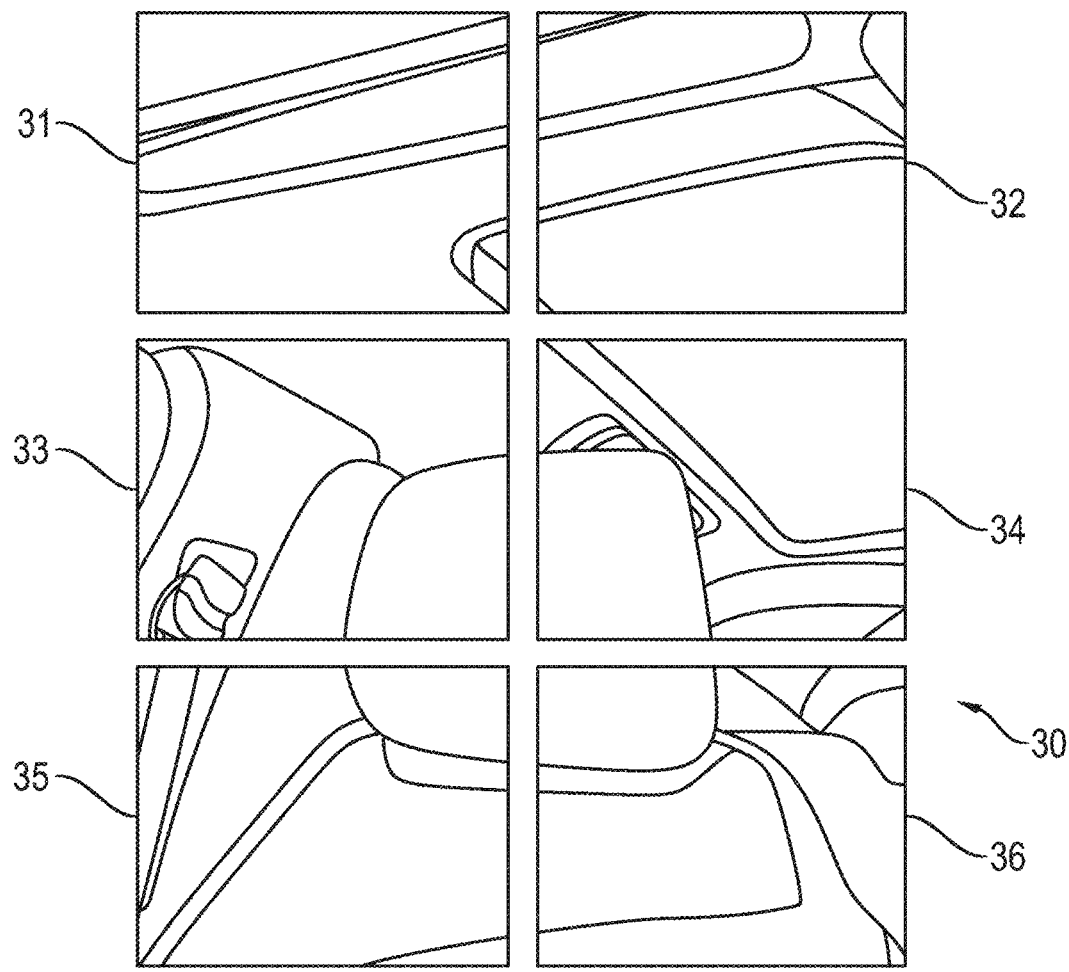
FIG. 3 shows an image of the interior which is generated based on the image captured by the image capturing device and divided into six image sections.

FIG. 3 shows an image 30 of the interior 11 which is generated based on the image 20 shown in FIG. 2, wherein a file size of the image 20 has been reduced, the right-hand image section 22 has been extracted and the image has been divided into six image sections, namely a left upper image section 31, a right upper image section 32, a left middle image section 33, a right middle image section 34, a left lower image section 35, and a right lower image section 36.

Figures 4, 5:
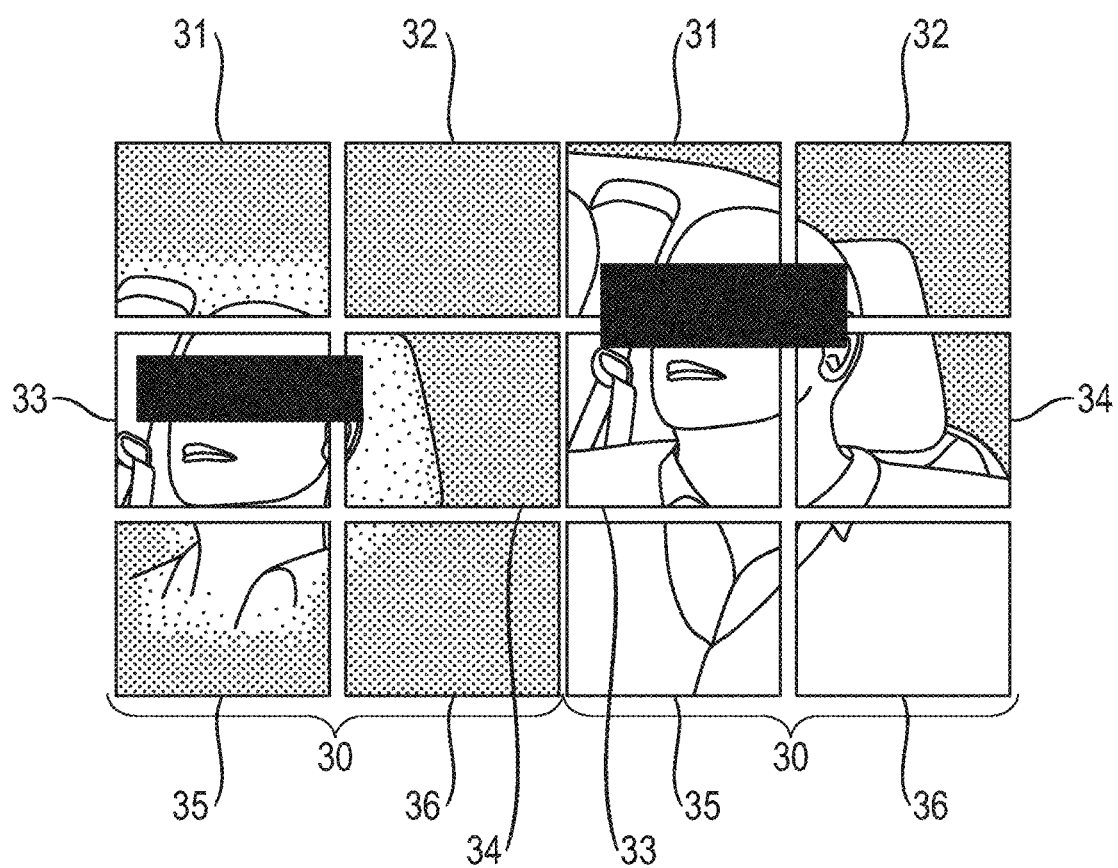
FIG. 4 shows an image of the interior which is generated based on an image captured by the image capturing device and divided into six image sections, in which a diffuser for scattering a light emitted by an illumination device for illuminating the interior is not functional and properly arranged in a beam path of the illumination device.
FIG. 5 shows an image of the interior which is generated based on an image captured by the image capturing device and divided into six image sections, in which the diffuser is functional and properly arranged in the beam path of the illumination device.

FIG. 4 shows an image 30 of the interior 11 which is generated based on an image 20 captured by the image capturing device 130 and which contains an image of the driver, wherein the generated image 30 is divided into six image sections 31-36, and the diffuser 120 was not functional and properly arranged in the beam path of the illumination device when the image 20 was captured. As can be seen from FIG. 4, in this case the driver's head is brightly illuminated by the illumination device 110, as a result of which the driver's eyes could be damaged, while the rest of the image 30 is substantially dark.

FIG. 5 shows an image 30 of the interior 11 which is generated based on an image 20 captured by the image capturing device 130 and which contains an image of the driver, wherein the generated image 30 is divided into six image sections 31-36, and the diffuser 120 was functional and properly arranged in the beam path of the illumination device when the image 20 was captured. As can be seen from FIG. 5, in this case a brightness of the generated image 30 is substantially homogeneous due to the scattering of the light from the illumination device 110 by means of the diffuser 120, which prevents damage to the driver's eyes.

In the method according to the invention, a maximum intensity of pixels of a first group 33, 34 of image sections of the image 30, which comprises the left middle image section 33 and the right middle image section 34, and an average intensity of a second group 31, 32, 36; 31, 32, 35 of image sections of the image 30, which comprises the left upper image section 31, the right upper image section 32 and the right lower image section 36 or the left upper image section 31, the right upper image section 32 and the left lower image section 35 are determined. Since in the present case the vehicle 10 is one which is configured as right-hand drive, the second group comprises the left upper image section 31, the right upper image section 32 and the right lower image section 36.

Then, a difference in illumination of the image 30 is determined by dividing the maximum intensity of the first group 33, 34 of image sections of the image 30 by the mean intensity of the second group 31, 32, 36; 31, 32, 35 of image sections of the image 30. It is then determined based on the determined illumination difference that the diffuser 120 is functional and properly arranged in the beam path of the illumination device 110 and the illumination device 110 for driver monitoring is activated if the difference in illumination of the image 30 is smaller than a lower threshold value, or it is determined that the diffuser 120 is not functional and properly arranged in the beam path of the illumination device 110 and the illumination device 110 is deactivated when the difference in illumination is greater than an upper threshold value.

If the difference in illumination is greater than the lower threshold value and lower than the upper threshold value, the image 30 is subjected to further processing steps, as explained below.

Figure 6:
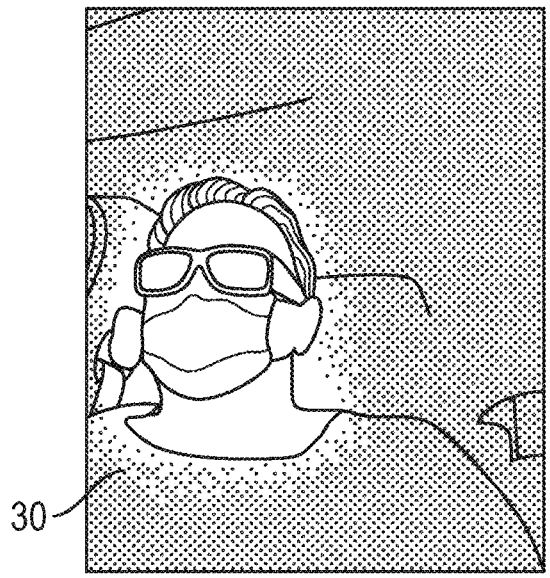
FIG. 6 shows an image of the interior which is generated based on an image captured by the image capturing device, in which the diffuser is not functional and properly arranged in the beam path of the illumination device.

FIG. 6 shows an image 30 of the interior 11 which is generated based on an image 20 captured by the image capturing device 130 which contains an image of the driver and in which the diffuser 120 is not functional and properly arranged in the beam path of the illumination device 110. In this case, the difference in illumination is greater than the lower threshold value and lower than the upper threshold value.

Figure 7:
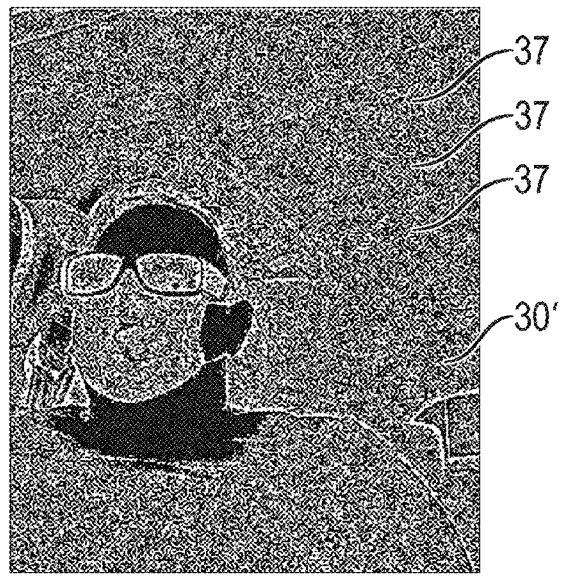
FIG. 7 shows the image shown in FIG. 6, to which a Laplace filter has been applied.

FIG. 7 shows a modified image 30' based on the image 30 shown in FIG. 6, wherein a Laplace filter has been applied to the image shown in FIG. 6, as a result of which at least one edge 37 in the modified image 30' becomes visible, said edge being captured by means of the method according to the invention or the driver monitoring device 100.

Figure 8:
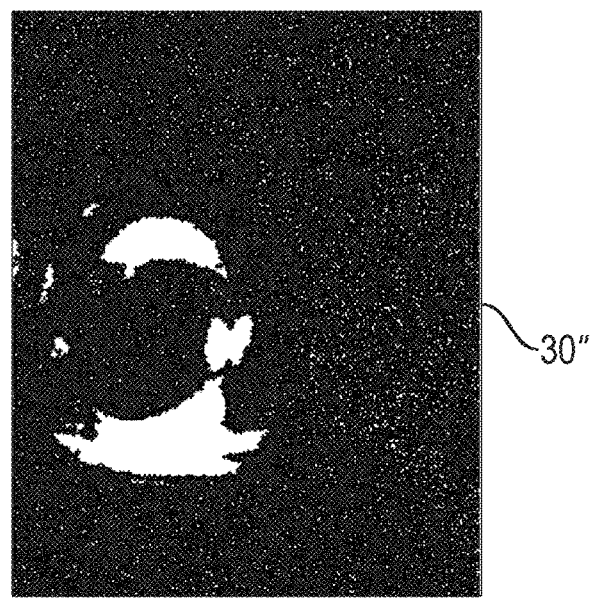
FIG. 8 shows a modified image based on the image shown in FIG. 7.

After this, an intensity value of pixels of the modified image 30' which do not have a section of the at least one edge 37 is set to a maximum intensity value, and the intensity value of pixels of the modified image 30' which do have a section of the at least one edge 37 is set to a minimum intensity value so as to obtain a modified image 30" illustrated in FIG. 8.

A median filter is then applied to the modified image 30" illustrated in FIG. 8 so as to obtain a filtered image 30'" illustrated in FIG. 9.

One or more sections are removed from the filtered image 30'" illustrated in FIG. 9, for example by setting the pixels of these sections to the minimum intensity value, wherein at least one of these sections contains an image of at least one section of a steering wheel area 12 of the vehicle 10, on which, as illustrated in FIG. 12, the driver's hand is usually positioned and which due to the reflection of the light emitted by the illumination device 110 by the skin of the hand results/would result in pixels with a high intensity, in order to obtain a test image section of the filtered image 30''''.

FIG. 11 shows an image section of an image which is based on the generated image shown in FIG. 10; and FIG. 12 shows the image shown in FIG. 11 from which the steering wheel area 12 has been removed.

Then a number of pixels with maximum intensity in the test image section of the filtered image 30" is determined. Based on the number of pixels with maximum intensity in the test image section of the filtered image 30", in particular based on a number of pixels with maximum intensity scaled to a predetermined image size and a comparison of the number of pixels scaled to the predetermined image size with a threshold value, it is then determined whether or not the diffuser 120 is functional and properly arranged in the beam path of the illumination device 110, and a piece of corresponding information is stored in the storage unit 14 of the control unit 13 of the vehicle 10.

Preferably, in the method according to the invention/by means of the driver monitoring device 110 according to the invention, multiple images of the interior 11, in particular four images, are captured by means of the image capturing device 130, where two of the images are captured with different exposure times while the interior 11 is illuminated by means of the illumination device 110, and two of the images are captured with the different exposure times while the interior 11 is not illuminated by means of the illumination device 110. The four images are then processed as described above, and it is determined based on the number of pixels with maximum intensity in the respective test image sections whether or not the diffuser 120 is functional and properly arranged in the beam path of the illumination device 110.

LIST OF REFERENCE SIGNS

10 Vehicle
11 Interior
12 Steering wheel area
13 Control unit
14 Storage unit
20 Interior image
21 Left section of the interior image
22 Right section of the interior image
30 First image
37 Edge
100 Driver monitoring device
110 Illumination device
120 Diffuser
130 Image capturing device

The invention claimed is:

1. A method for determining a state of a driver monitoring device, the device comprising an illumination device for illuminating an interior of a vehicle, a diffuser (120) arranged in a beam path of the illumination device in the correct state of the driver monitoring device for scattering a light emitted by the illumination device, and an image capturing device for capturing an image of the interior, the method comprising:
    illuminating, by the illumination device, the interior, and generating at least one first image of at least one section of the interior,
        wherein said first image being based on an image of the interior which is illuminated by means of the illumination device,
        wherein said image is captured by the image capturing device;
    dividing the at least one first image into a left upper image section, a right upper image section, a left middle image section, a right middle image section, a left lower image section and a right lower image section;
    determining a maximum intensity of pixels of a first group of image sections of the at least one first image,
        wherein said first group comprising the left middle image section and the right middle image section; and
    determining an average intensity of a second group of image sections of the at least one first image,
        wherein said second group comprising the left upper image section, the right upper image section and the right lower image section or the left upper image section, the right upper image section and the left lower image section;
    determining a difference in illumination of the at least one first image by dividing the maximum intensity of the first group of image sections of the at least one first image by the mean intensity of the second group of image sections of the at least one first image; and
    determining that the diffuser is functional and properly arranged in the beam path of the illumination device and activating the illumination device for driver monitoring if the difference in illumination of the at least one first image is smaller than a lower threshold value, or
    determining that the diffuser is not functional and properly arranged in the beam path of the illumination device and deactivating the illumination device if the difference in illumination is greater than an upper threshold value.

2. The method as claimed in claim 1, further comprising:
    applying a Laplace filter to the at least one first image if the difference in illumination is greater than the lower threshold value and smaller than the upper threshold value so as to obtain a modified at least one first image;
    capturing at least one edge in the modified at least one first image;
    setting an intensity value of pixels of the modified at least one first image which have no section of the at least one edge to a maximum intensity value, and setting the intensity value of pixels of the modified at least one first image which do have a section of the at least one edge to a minimum intensity value so as to obtain a modified at least one first image;
    applying a median filter to the modified at least one first image so as to obtain a filtered at least one first image;
    removing one or more sections of the filtered at least one first image, wherein at least one section contains an image of at least one section of a steering wheel area of the vehicle so as to obtain a test image section of the filtered at least one first image;
    determining a number of pixels with maximum intensity in the test image section of the filtered at least one first image;
    determining, based on the number of pixels with maximum intensity in the test image section of the filtered at least one first image, whether or not the diffuser is functional and properly arranged in the beam path of the illumination device; and
    storing a piece of corresponding information in a storage unit of a control unit of the vehicle.

3. The method as claimed in claim 2, further comprising:
    generating at least one second image of the at least one section of the interior, said second image being based on an image captured by the image capturing device while the interior is not illuminated by means of the illumination device;
    dividing the at least one second image into a left upper image section, a right upper image section, a left middle image section, a right middle image section, a left lower image section and a right lower image section;

determining a maximum intensity of pixels of a first group of image sections of the at least one second image, said group comprising the left lower image section and the right lower image section, and determining an average intensity of a second group of image sections of the at least one second image, said group comprising the left upper image section, the right upper image section and the right lower image section or the left upper image section, the right upper image section and the left lower image section;

determining a difference in illumination of the at least one second image by dividing the maximum intensity of the first group of image sections of the at least one second image by the mean intensity of the second group of image sections of the at least one second image;

applying a Laplace filter to the at least one second image if the difference in illumination is greater than the lower threshold value and smaller than the upper threshold value so as to obtain a modified at least one second image;

capturing at least one edge in the modified at least one second image;

setting an intensity value of pixels of the modified at least one second image which have no section of the at least one edge to a maximum intensity value;

setting the intensity value of pixels of the modified at least one second image having a section of the at least one edge to a minimum intensity value so as to obtain a modified at least one second image;

applying a median filter to the modified at least one second image so as to obtain a filtered at least one second image;

removing one or more sections of the filtered at least one second image, wherein at least one section contains an image of at least one section of a steering wheel area of the vehicle so as to obtain a test image section of the filtered at least one second image;

determining a number of pixels with maximum intensity in the test image section of the filtered at least one second image; and determining, based on the number of pixels with maximum intensity in the test image section of the filtered at least one first image and the number of pixels with maximum intensity in the test image section of the filtered at least one second image, whether or not the diffuser is functional and properly arranged in the beam path of the illumination device.

4. The method as claimed in claim 3, further comprising:
generating a first image based on an image captured by the image capturing device with a first exposure time of preferably 36 μs;

generating another first image based on an image captured by the image capturing device with a second exposure time of preferably 640 μs;

generating a second image based on an image captured by the image capturing device with the first exposure time;

generating another second image based on an image captured by the image capturing device with the second exposure time; and determining, based on the number of pixels with maximum intensity in the test image section of the filtered one first image, the number of pixels with maximum intensity in the test image section of the filtered other first image, the number of pixels with maximum intensity in the test image section of the one filtered second image and the number of pixels with maximum intensity in the test image section of the filtered other second image, whether or not the diffuser is functional and properly arranged in the beam path of the illumination device.

5. The method as claimed in claim 1, wherein the interior is illuminated by means of the illumination device with light of an intensity lower than an intensity of a light with which the interior is illuminated during normal operation of the driver monitoring device.

6. The method as claimed in claim 1, wherein the generation of the at least one first image and/or of the at least one second image comprises an extraction of an image section of an image based on the image of the interior captured by the image capturing device and/or a reduction of a file size of an image based on the image of the interior captured by the image capturing device.

7. The method as claimed in claim 6,
wherein a left-hand image section is extracted when the vehicle is configured as right-hand drive and a right-hand image section is extracted when the vehicle is configured as left-hand drive, wherein the second group comprises the left upper image section, the right upper image section and the right lower image section when the vehicle is configured as right-hand drive, and the second group comprises the left upper image section, the right upper image section and the left lower image section when the vehicle is configured as left-hand drive.

8. The method as claimed in claim 2, further comprising:
communicating with the control unit of the vehicle;
determine, based on the information stored in the storage unit, whether or not the diffuser is functional and properly arranged in the beam path of the illumination device;

deactivating permanently the illumination device; and
terminating the method if the information stored in the storage unit is that the diffuser is not functional and properly arranged in the beam path of the illumination device, or continuing with the illuminating step when the information stored in the storage unit is that the diffuser is functional and properly arranged in the beam path of the illumination device.

9. A driver monitoring device comprises:
an illumination device for illuminating an interior of a vehicle,
a diffuser arranged in a beam path of the illumination device in the correct state of the driver monitoring device for scattering a light emitted by the illumination device, and
an image capturing device for capturing an image of the interior,
wherein the driver monitoring device is configured to:
illuminate, by means of the illumination device, the interior, and to generate at least one first image of at least one section of the interior, which first image is based on an image of the interior which is illuminated by means of the illumination device, said image being captured by the image capturing device;
divide the at least one first image into a left upper image section, a right upper image section, a left middle image section, a right middle image section, a left lower image section and a right lower image section;

determine a maximum intensity of pixels of a first group of image sections of the at least one first image, said group comprising the left middle image section and the right middle image section;
determine an average intensity of a second group of image sections of the at least one first image, said group comprising the left upper image section, the right upper image section and the right lower image section or the left upper image section, the right upper image section and the left lower image section;
determine a difference in illumination of the at least one first image by dividing the maximum intensity of the first group of image sections of the at least one first image by the mean intensity of the second group of image sections of the at least one first image;
determine that the diffuser is functional and properly arranged in the beam path of the illumination device;
activate the illumination device for driver monitoring if the difference in illumination of the at least one first image is smaller than a lower threshold value, or
determine that the diffuser is not functional and properly arranged in the beam path of the illumination device; and
deactivate the illumination device if the difference in illumination is greater than an upper threshold value.

10. The driver monitoring device as claimed in claim 9, wherein the driver monitoring device is further configured to:
apply a Laplace filter to the at least one first image if the difference in illumination is greater than the lower threshold value and smaller than the upper threshold value so as to obtain a modified at least one first image, and to capture at least one edge in the modified at least one first image;
set an intensity value of pixels of the modified at least one first image (30') which have no section of the at least one edge to a maximum intensity value, and to set the intensity value of pixels of the modified at least one first image which do have a section of the at least one edge to a minimum intensity value so as to obtain a modified at least one first image;
apply a median filter to the modified at least one first image so as to obtain a filtered at least one first image;
remove one or more sections of the filtered at least one first image, wherein at least one section contains an image of at least one section of a steering wheel area of the vehicle so as to obtain a test image section of the filtered at least one first image;
determine a number of pixels with maximum intensity in the test image section of the filtered at least one first image and, based on the number of pixels with maximum intensity in the test image section of the filtered at least one first image;
determine whether or not the diffuser is functional and properly arranged in the beam path of the illumination device; and
store a piece of corresponding information in a storage unit of a control unit of the vehicle.

11. The driver monitoring device as claimed in claim 10, wherein the driver monitoring device is further configured to:
generate at least one second image of the at least one section of the interior,
wherein said image second image is based on an image captured by the image capturing device while the interior is not illuminated by means of the illumination device;
divide the at least one second image into a left upper image section, a right upper image section, a left middle image section, a right middle image section, a left lower image section and a right lower image section;
determine a maximum intensity of pixels of a first group of image sections of the at least one second image which comprises the left lower image section and the right lower image section;
determine an average intensity of a second group of image sections of the at least one second image which comprises the left upper image section, the right upper image section and the right lower image section or the left upper image section, the right upper image section and the left lower image section;
determine a difference in illumination of the at least one second image by dividing the maximum intensity of the first group of image sections of the at least one second image by the mean intensity of the second group of image sections of the at least one second image;
apply a Laplace filter to the at least one second image if the difference in illumination is greater than the lower threshold value and smaller than the upper threshold value so as to obtain a modified at least one second image, and to capture at least one edge in the modified at least one second image;
set an intensity value of pixels of the modified at least one second image which have no section of the at least one edge to a maximum intensity value, and to set the intensity value of pixels of the modified at least one second image which do have a section of the at least one edge to a minimum intensity value so as to obtain a modified at least one second image;
apply a median filter to the modified at least one second image so as to obtain a filtered at least one second image;
remove one or more sections of the filtered at least one second image, wherein at least one section contains an image of at least one section of a steering wheel area of the vehicle so as to obtain a test image section of the filtered at least one second image; and
determine a number of pixels with maximum intensity in the test image section of the filtered at least one second image,
determine, based on the number of pixels with maximum intensity in the test image section of the filtered at least one first image and the number of pixels with maximum intensity in the test image section of the filtered at least one second image, whether or not the diffuser is functional and properly arranged in the beam path of the illumination device.

12. The driver monitoring device as claimed in claim 11, wherein the driver monitoring device is configured to:
generate a first image which is based on an image which is captured by the image capturing device with a first exposure time of 36 µs;
generate another first image which is based on an image which is captured by the image capturing device with a second exposure time of 640 µs;
generate a second image which is based on an image which is captured by the image capturing device with the first exposure time;

generate another second image which is based on an image which is captured by the image capturing device with the second exposure time; and determine, based on the number of pixels with maximum intensity in the test image section of the filtered one first image, the number of pixels with maximum intensity in the test image section of the filtered other first image, the number of pixels with maximum intensity in the test image section of the one filtered second image and the number of pixels with maximum intensity in the test image section of the filtered other second image, whether or not the diffuser is functional and properly arranged in the beam path of the illumination device.

13. The driver monitoring device as claimed in claim 9, wherein the driver monitoring device is configured, to illuminate the interior by the illumination device with light of an intensity lower than an intensity of a light with which the interior is illuminated during normal operation of the driver monitoring device.

14. The driver monitoring device as claimed in claim 9, wherein the driver monitoring device is configured to generate the at least one first image and/or the at least one second image by extracting an image section of an image based on the image of the interior captured by the image capturing device and/or reducing a file size of an image based on the image of the interior captured by the image capturing device.

15. The driver monitoring device as claimed in claim 14, wherein the driver monitoring device is configured to:

extract a left-hand image section when the vehicle is configured as right-hand drive; and extract a right-hand image section when the vehicle is configured as left-hand drive, wherein the second group comprises the left upper image section, the right upper image section and the right lower image section when the vehicle is configured as right-hand drive, and wherein the second group comprises the left upper image section, the right upper image section and the left lower image section when the vehicle is configured as left-hand drive.

16. The driver monitoring device as claimed in claim 10, wherein the driver monitoring device is configured to, before illumination:

communicate with the control unit of the vehicle;

determine, based on the information stored in the storage unit, whether or not the diffuser is functional and properly arranged in the beam path of the illumination device;

deactivate permanently the illumination device; and terminate the driver monitoring operation if the information stored in the storage unit is that the diffuser is not functional and properly arranged in the beam path of the illumination device, or continue the driver monitoring operation when the information stored in the storage unit is that the diffuser is functional and properly arranged in the beam path of the illumination device.

* * * * *